US011003199B2

(12) United States Patent
Fassolette et al.

(10) Patent No.: US 11,003,199 B2
(45) Date of Patent: May 11, 2021

(54) MIXING UNIT AND MIXER TAP COMPRISING SUCH A MIXING UNIT

(71) Applicant: VERNET, Ollainville (FR)

(72) Inventors: Pierre-Olivier Fassolette, Corbeil Essonnes (FR); Matthieu Draber, Milly la Foret (FR)

(73) Assignee: VERNET, Ollainville (FR)

(*) Notice: Subject to any disclaimer, the term of this patent is extended or adjusted under 35 U.S.C. 154(b) by 86 days.

(21) Appl. No.: 16/319,015

(22) PCT Filed: Jul. 20, 2017

(86) PCT No.: PCT/EP2017/068407
§ 371 (c)(1),
(2) Date: Feb. 11, 2019

(87) PCT Pub. No.: WO2018/015509
PCT Pub. Date: Jan. 25, 2018

(65) Prior Publication Data
US 2019/0286175 A1 Sep. 19, 2019

(30) Foreign Application Priority Data

Jul. 21, 2016 (FR) ...................................... 1656965

(51) Int. Cl.
*G05D 23/13* (2006.01)
(52) U.S. Cl.
CPC ..... *G05D 23/1353* (2013.01); *G05D 23/1346* (2013.01)
(58) Field of Classification Search
CPC .. G05D 23/133; G05D 23/1346; G05D 23/13; G05D 23/132; G05D 23/134;
(Continued)

(56) References Cited

U.S. PATENT DOCUMENTS 3,248,056 A 4/1966 Obermaier
3,409,039 A 11/1968 Griffin
(Continued)

FOREIGN PATENT DOCUMENTS

CN 1262384 A 8/2000
CN 201763433 U 3/2011
(Continued)

OTHER PUBLICATIONS

International Search Report issued by the International Searching Authority in International Application No. PCT/EP2017/059716, dated Aug. 4, 2017, 4 pages total.
(Continued)

*Primary Examiner* — Kun Kai Ma
(74) *Attorney, Agent, or Firm* — Troutman Pepper Hamilton Sanders LLP

(57) ABSTRACT

A mixing unit comprises two inlets for incoming streams at different temperatures, mixing means of these incoming streams for forming an outgoing stream, a main outlet for the outgoing stream, and a heat-sensitive actuator, comprising a first heat-sensitive part, arranged at the main outlet, and a second part, actuated in translation by the first part. According to the invention, the mixing unit comprises a shutter, which is actuated by the heat-sensitive actuator, so as to move between a closed position of the main outlet and an open position of the main outlet, based on the relative position of the first part and the second part, the shutter and the first part therefore not creating an imbalance between the flow rate of the first incoming stream and the flow rate of the second incoming stream.

14 Claims, 13 Drawing Sheets

(58) Field of Classification Search
CPC . G05D 23/135; F16K 11/0787; F16K 19/006; F16K 31/002; E03C 1/02
See application file for complete search history.

(56) References Cited

U.S. PATENT DOCUMENTS

| | | | |
|---|---|---|---|
| 4,257,553 A | 3/1981 | Sliger | |
| 4,283,823 A | 8/1981 | Buswell | |
| 4,630,770 A | 12/1986 | Sliger | |
| 4,691,861 A | 9/1987 | Sliger | |
| 4,763,834 A | 8/1988 | Duprez | |
| 5,110,044 A * | 5/1992 | Bergmann | G05D 23/1353 236/12.16 |
| 5,370,305 A * | 12/1994 | Schneider | G05D 23/1353 137/625.4 |
| 5,549,244 A | 8/1996 | Kai | |
| 5,603,485 A | 2/1997 | Schwarz | |
| 5,899,378 A | 5/1999 | Hainle | |
| 6,079,625 A * | 6/2000 | Lebkuchner | G05D 23/1346 236/12.2 |
| 6,676,025 B2 * | 1/2004 | Ginter | F16K 11/0787 137/625.4 |
| 8,028,926 B2 | 10/2011 | Heldberg et al. | |
| 8,028,936 B2 | 10/2011 | McDermott | |
| 8,740,097 B2 * | 6/2014 | Platet | G05D 23/1353 236/12.11 |
| 9,133,942 B2 | 9/2015 | Ito | |
| 2002/0059906 A1 | 5/2002 | Friesenhahn | |
| 2002/0130189 A1 | 9/2002 | Mace et al. | |
| 2005/0006487 A1 * | 1/2005 | Suda | G05D 23/1951 236/46 R |
| 2006/0243813 A1 * | 11/2006 | Beck | G05D 23/1353 236/12.11 |
| 2007/0261738 A1 * | 11/2007 | Mace | F16K 31/002 137/468 |
| 2008/0135633 A1 | 6/2008 | Heldberg | |
| 2009/0025809 A1 | 1/2009 | Oh | |
| 2010/0077583 A1 | 4/2010 | Takaya | |
| 2010/0089467 A1 | 4/2010 | Bouloy | |
| 2010/0230504 A1 | 9/2010 | Pottie | |
| 2011/0198518 A1 | 8/2011 | Habermann | |
| 2013/0112763 A1 | 5/2013 | Roman | |
| 2013/0126624 A1 | 5/2013 | Park | |
| 2013/0180477 A1 | 7/2013 | Nakajima | |
| 2013/0200167 A1 | 8/2013 | Auweder | |
| 2013/0264393 A1 | 10/2013 | Onishi | |
| 2013/0334324 A1 * | 12/2013 | Ruga | F16K 31/002 236/12.13 |
| 2014/0345711 A1 | 11/2014 | Ueno | |
| 2015/0368886 A1 * | 12/2015 | Waudoit | E03B 7/045 137/468 |
| 2016/0011606 A1 * | 1/2016 | Draber | G05D 23/1353 236/12.21 |
| 2016/0108797 A1 | 4/2016 | Palumbo | |
| 2016/0333767 A1 | 11/2016 | Pattie | |
| 2018/0059693 A1 | 3/2018 | Rodriguez | |
| 2018/0223508 A1 | 8/2018 | Fassolette | |

FOREIGN PATENT DOCUMENTS

| | | | | |
|---|---|---|---|---|
| CN | 102536417 A | | 7/2012 | |
| DE | 197 16 307 A1 | | 10/1998 | |
| DE | 19716307 A1 * | | 10/1998 | F16K 11/0782 |
| DE | 10 2005 001303 A1 | | 7/2006 | |
| EP | 1 020 671 A2 | | 7/2000 | |
| EP | 2335127 B1 | | 3/2012 | |
| FR | 2 841 348 A1 | | 12/2003 | |
| FR | 2 876 433 A1 | | 4/2006 | |
| FR | 3 003 046 A1 | | 9/2014 | |
| JP | 59106778 A * | | 6/1984 | G05D 23/1353 |
| WO | 97/21949 A1 | | 6/1997 | |
| WO | 2005/124495 A1 | | 12/2005 | |
| WO | 2014/135614 A2 | | 9/2014 | |
| WO | 2015/086749 A1 | | 6/2015 | |

OTHER PUBLICATIONS

International Search Report dated Jul. 4, 2016 during the prosecution of International Application No. PCT/EP2016/056547.
International Search Report dated Mar. 1, 2017 during the prosecution of PCT/EP2016/079878.
Rapport De Recherche Préliminaire issued in corresponding French Patent Application No. 1653676 dated Jan. 5, 2017 (in French).
International Search Report issued by the International Searching Authority in International Application No. PCT/EP2017/059708, dated Aug. 1, 2017, 3 pages total.
French Search Report for Application No. FR 1656965 dated Mar. 15, 2017.
International Search Report and Written Opinion for Application No. PCT/EP2017/068407 dated Jan. 25, 2018.

* cited by examiner

MIXING UNIT AND MIXER TAP COMPRISING SUCH A MIXING UNIT

CROSS-REFERENCE TO RELATED APPLICATIONS

This is a U.S. national phase application under 35 U.S.C. § 371 of International Patent Application No. PCT/EP 2017/068407 filed Jul. 20, 2017, and claims benefit of priority to French Patent Application No. 16 56965, Jul. 21, 2016. The entire contents of these applications are hereby incorporated by reference.

Field of the Invention

The present invention relates to a mixing unit and a mixer tap comprising such a mixing unit.

Background

The invention relates to the field of valves and fittings for household use. In particular, so-called "mixer" taps make it possible to emit a running stream of mixed water by mixing a stream of hot water and a stream of cold water within a cartridge mounted in the body of the tap. The respective flow rate of the cold water and hot water streams allowed into the cartridge can be adjusted using a control lever, so as to allow an adjustment of the temperature of the mixed stream by rotating the lever around an axis, and the flow rate of the mixed stream by rotating the lever around a second axis.

In most cases, the cartridge comprises a pair of open-worked ceramic discs, one being stationary and the other moving under the action of the lever while being in planar, sliding and sealed contact with the stationary disc. Based on the position of the moving disc on the stationary disc, channels are formed to allow the intake of cold and hot water streams within the cartridge, with a higher or lower flow rate, and thus to cause their mixing to form the mixed stream.

Some known cartridges can be provided with an additional separate casing, which is attached against the cartridge. For example, patent FR-B-2,876,433 describes a cartridge for a mixer tap equipped with an additional thermostatic casing coupled sealably to the base of the cartridge. The additional thermostatic casing is provided with a thermostatic element comprising a cup, containing a thermodilatable wax actuating a piston in translation as a function of the temperature to which the cup is subjected. Thus, when the temperature of the mixed flow exceeds a preset threshold value, a shutter is actuated by the piston to close the hot water passage before it enters the cartridge, in order to automatically limit the temperature of the mixed stream. Thus, the mixed flow is temperature-regulated, so as not to exceed the preset threshold temperature.

Nevertheless, this known type of additional casing may cause a reduction in the hot water flow rate, even when the shutter is open, while the cold water flow rate is affected little or not at all by the presence of the casing. In other words, this known additional casing may imbalance the flow rates of the incoming streams relative to one another.

SUMMARY

As a result, the invention aims to provide an alternative to the prior art by proposing a new mixing unit that does not cause an imbalance in the flow rate of the incoming streams.

The invention relates to a mixing unit for a mixer tap, the mixing unit comprising:
- a first inlet for a first incoming stream of fluid having a first temperature,
- a second inlet for a second incoming stream of fluid having a second temperature higher than the first temperature,
- mixing means for mixing the first incoming stream with the second incoming stream to form an outgoing stream of fluid having an outlet temperature,
- a main outlet for the outgoing stream, and
- a heat-sensitive actuator, comprising:
    - a first part, which is heat-sensitive and which is arranged, at least in part, at the main outlet, and
    - a second part, actuated in translation by the first part along a closing axis.

According to the invention, the mixing unit comprises a shutter, which is actuated by the heat-sensitive actuator, so as to move between a closed position, at least partial, of the main outlet and an open position of the main outlet, based on the relative position of the first part and the second part of the heat-sensitive actuator along the closing axis.

Owing to the invention, the shutter and at least part of the heat-sensitive first part are situated at the main outlet and thus do not create an imbalance between the flow rate of the first incoming stream and the flow rate of the second incoming stream.

According to other optional and advantageous features of the invention, considered alone or in combination:
- The mixing unit comprises a rear stop, the second part bearing against the rear stop in a rear direction along the closing axis, and the shutter is secured to the first part, or is formed at least in part by the first part, the first part being movable between the closed position and the open position.
- The mixing unit comprises:
    - a front stop, against which the shutter abuts in a forward direction, opposite the rear direction, when the shutter arrives in the closed position,
    - an overtravel plunger, which is translatable along the closing axis between a normal position and an overtravel position situated in the rear direction relative to the normal position, the overtravel plunger comprising the rear stop, and
    - an auxiliary resilient return element of the overtravel plunger from the overtravel position to the normal position.
- The overtravel plunger comprises axial outer ribs guiding the translation of the overtravel plunger along the closing axis, the axial outer ribs arranging circulation interstices between them for the exiting stream along the overtravel plunger.
- The mixing unit comprises a main resilient return element of the shutter from the closed position to the open position.
- The mixing means comprise a mixing chamber, within which the first inlet, the second inlet and the main outlet emerge, and the mixing unit comprises a closing neck, which is fluidly connected to the main outlet and which is configured to be closed by the shutter in the closed position, the first part being arranged in a passage section of the closing neck.
- The mixing unit comprises an outlet chamber, or an outlet housing, which extends along the closing axis from the closing neck to an axial outlet of the mixing unit, and the outlet chamber or the outlet housing comprises at least one radial outlet, which is arranged radially relative to the closing axis, the radial outlet preferably extending from the closing neck.

The mixing unit comprises:
- the outlet chamber,
- a first inlet pipe, which extends the first inlet, and
- a second inlet pipe, which extends the second inlet, the outlet chamber being arranged between the first inlet pipe and the second inlet pipe.

The mixing unit comprises:
- a cartridge, which includes the mixing means and which comprises a lower side, passed through by the first inlet, by the second inlet and by the main outlet, and
- an additional casing, which contains the heat-sensitive actuator, as well as the shutter, and which comprises an upper side by means of which the additional casing is attached against the lower side of the cartridge.

The heat-sensitive actuator is a thermostatic element, while the first part comprises a cup containing a thermodilatable body, and the second part is a piston sliding relative to the first part along the closing axis.

The heat-sensitive actuator is made, at least in part, from shape memory alloy, so as to be thermodilatable along the closing axis, while the second part of the heat-sensitive actuator is heat sensitive and forms a single-piece part with the first part, and the translation of the second part relative to the first part is obtained by reversible deformation of the heat-sensitive actuator.

The mixing unit has a cylindrical general shape defining a main axis of the mixing unit, the closing axis extending either in a plane substantially orthogonal to the axis, or parallel to the axis.

The invention also relates to a mixing tap comprising a mixing unit according to the preceding.

BRIEF DESCRIPTION OF THE DRAWINGS

The invention will be better understood upon reading the following description, given solely as a non-limiting example and done in reference to the drawings, in which.

DETAILED DESCRIPTION

Figure 1:
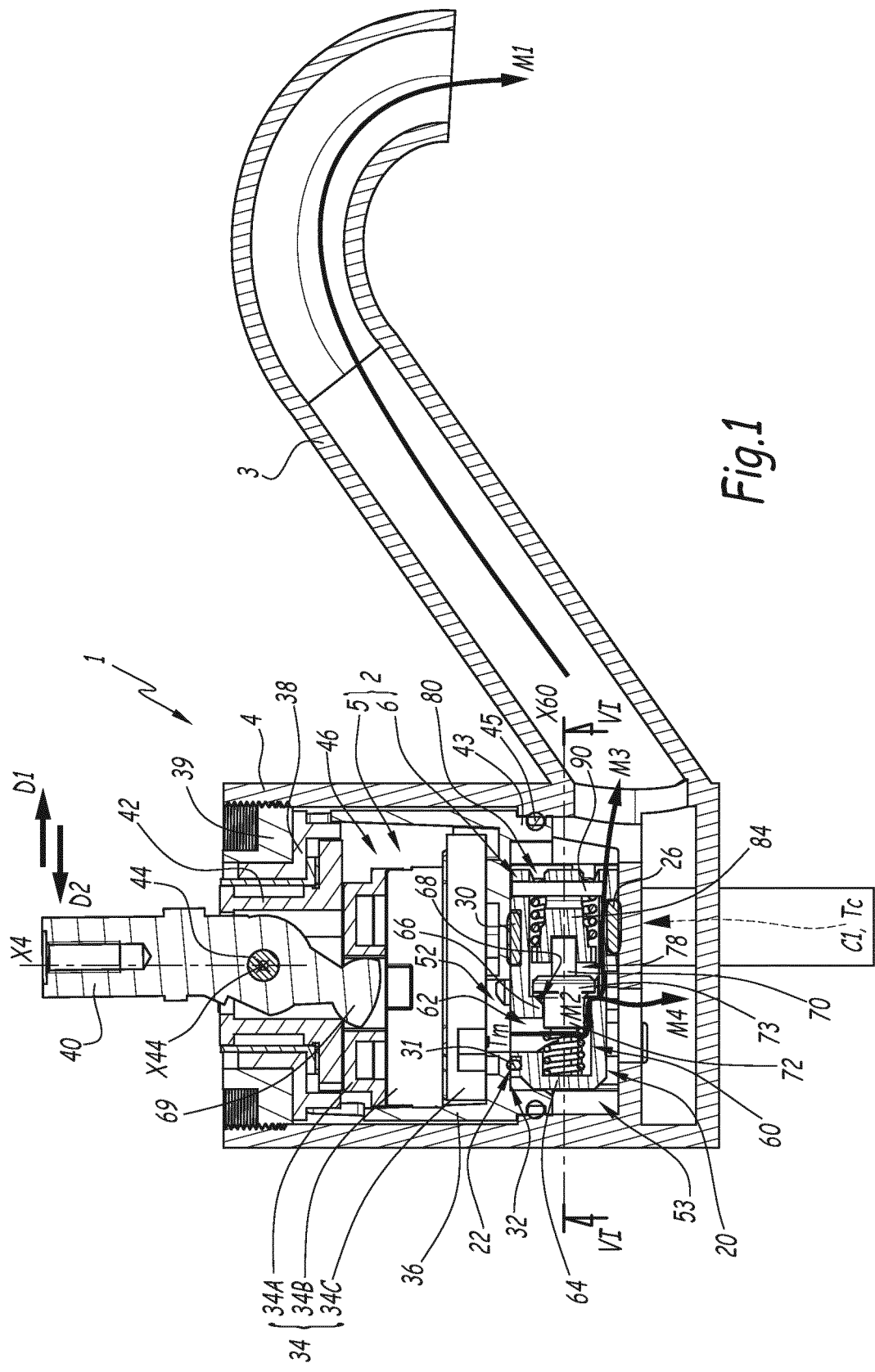
FIG. 1 is a longitudinal sectional view of a mixing tap comprising a mixing unit according to the invention.
Figure 2:
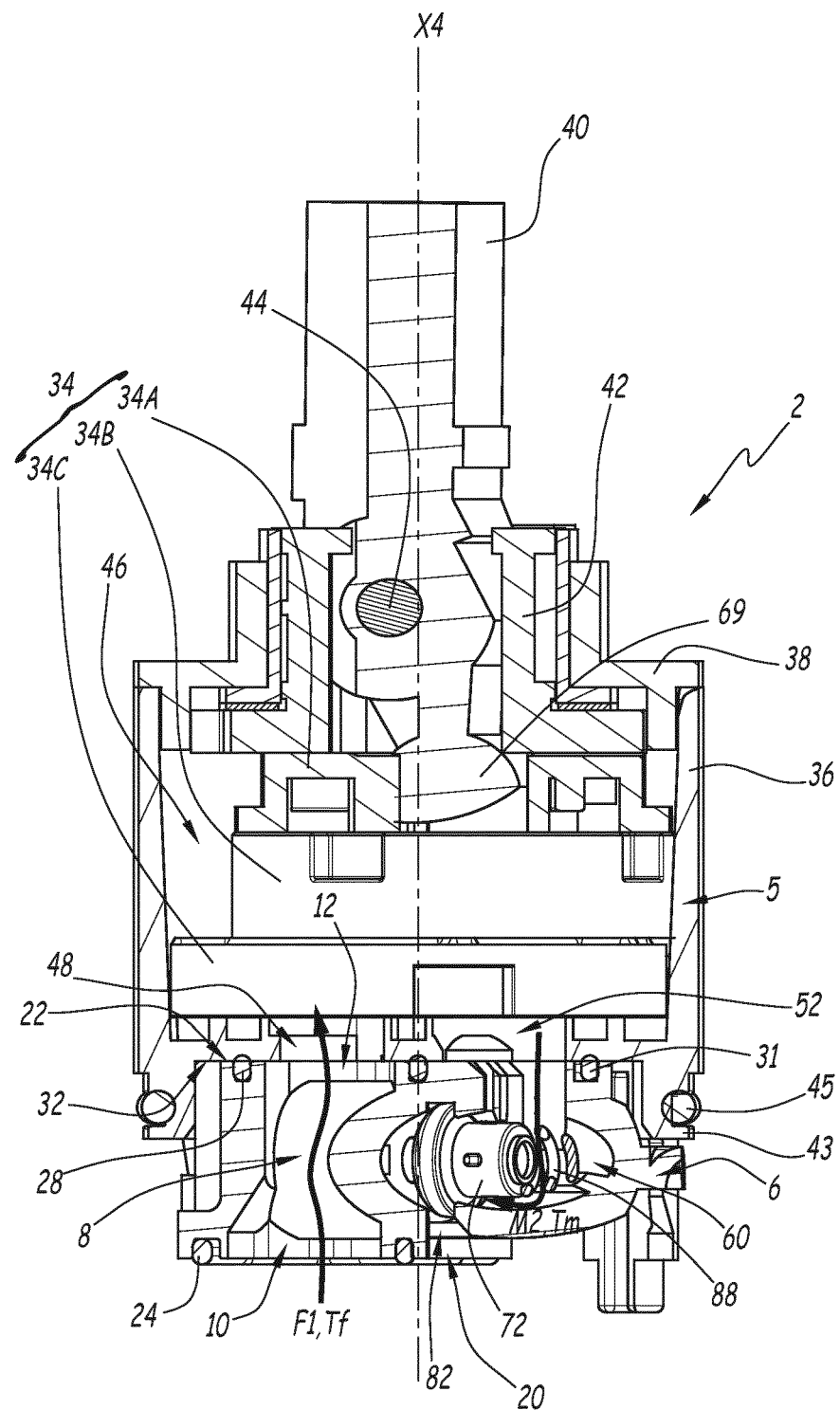
FIGS. 2 and 3 are longitudinal sectional views of the mixing unit of FIG. 1.
Figure 3:
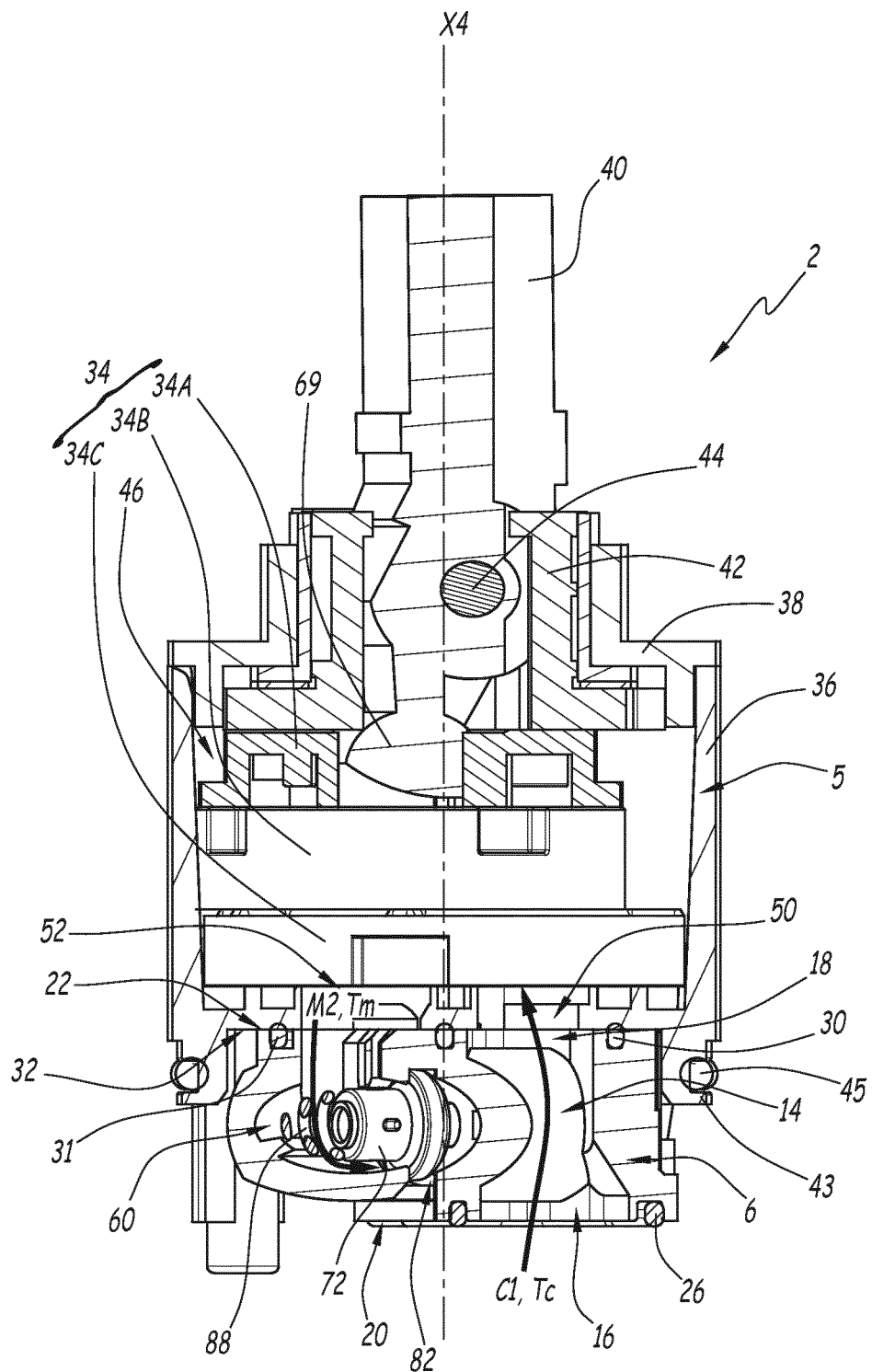
Figure 4:
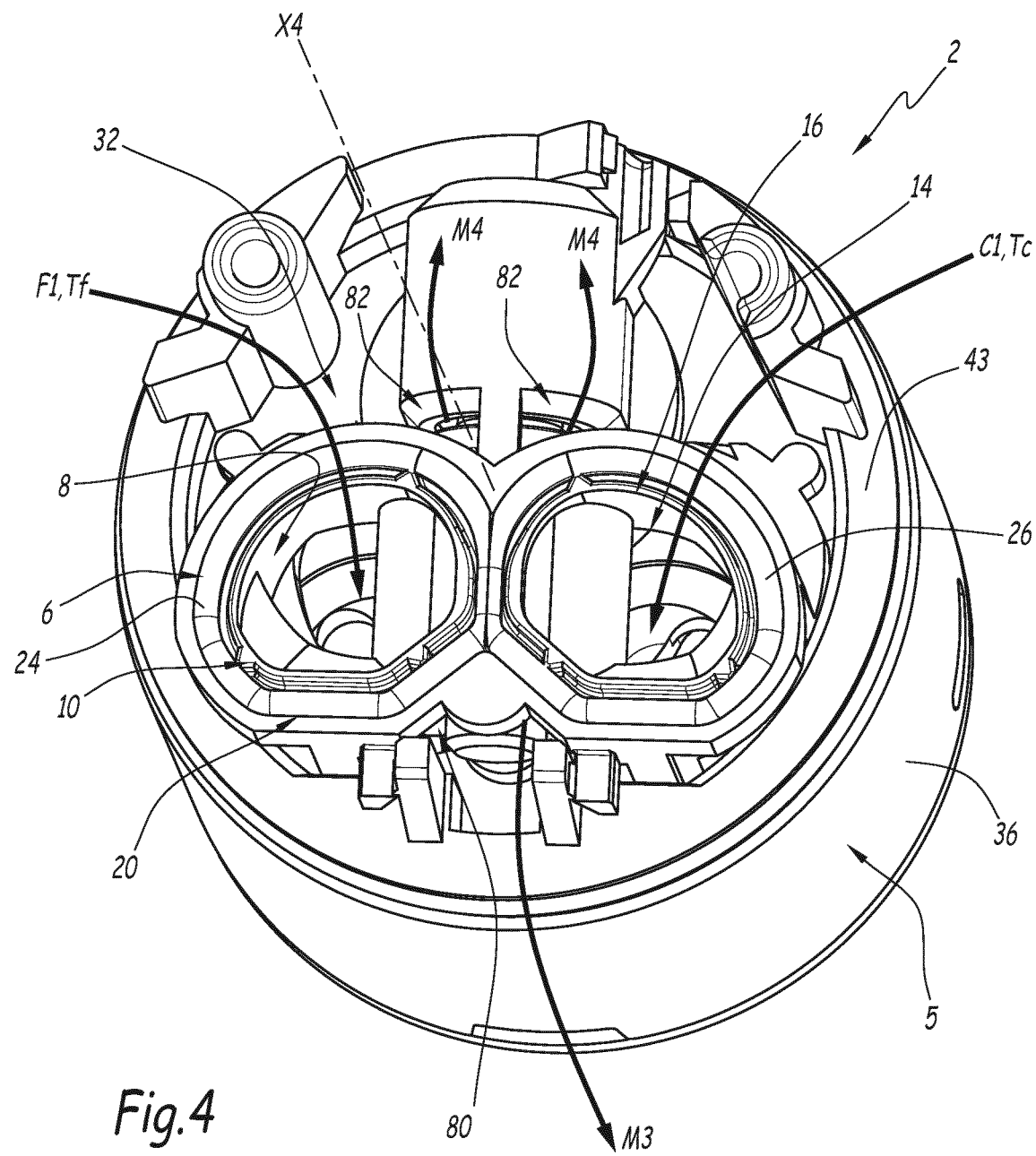
FIG. 4 is a perspective view of the bottom of the mixing unit of the preceding figures.

FIG. 1 illustrates a mixing tap 1, according to the first embodiment, comprising a mixing unit 2 shown alone in FIGS. 2 to 4. The mixing unit 2 is inserted into a body 4 of said mixing tap 1. The tap 1 is preferably designed to be installed on a basin of the sink or shower type, or more generally within a household installation, not illustrated. The body 4 preferably has a generally cylindrical and hollow shape, extending coaxially with a vertical axis X4, which is advantageously vertical when the tap 1 is mounted on the tub. For convenience, the rest of the description is oriented relative to the axis X4 of the illustrated example, considering that the terms "upper" and "top" correspond to an axial direction with respect to the axis X4, turned toward the upper part in FIG. 1, while the terms "lower" and "bottom" correspond to an axial direction in the opposite sense. Alternatively, the axis X4 is not vertical and is for example horizontal.

Upon command by a user, the mixing tap 1 is designed to emit, via a tip 3 protruding radially from the body 4 of the tap 1, a stream of mixed water M1 having a temperature and flow rate that are adjustable by the user. The tap 1 is supplied axially, in the lower part, by a first incoming stream of water F1, as illustrated in FIG. 2, called "cold water stream". The water from the first water stream F1 has a first temperature Tf. Additionally, the tap 1 is supplied axially and by a second incoming water stream C1, as illustrated in dotted lines in FIG. 1 and in FIG. 3, called "hot water stream". The water from the second water stream C1 has a second temperature Tc greater than the first temperature Tf.

The mixing unit 2 in turn has a main axis that is coaxial with the aforementioned axis X4 when the mixing unit 2 is mounted within the latter. Hereinafter, the axis of the tap 1 and the main axis of the mixing unit 2 are associated with the same reference X4.

In general, the mixing unit 2 has a substantially cylindrical shape coaxial with its main axis X4.

In this example, the mixing unit 2 comprises two parts, namely a cartridge 5, which extends in the upper part of the tap 1, and an additional casing 6 shown alone in FIGS. 5 to 8. The additional casing 6 is attached on a lower side 32 of the cartridge 5, in the lower part of the mixing unit 2. The cartridge 5 in particular has a generally cylindrical shape defining the main axis X4 of the mixing unit 2, with which the cartridge 5 is coaxial. The lower side 32 of the cartridge 5 preferably extends perpendicularly relative to the axis X4.

The additional casing 6 has a lower side 20, in particular visible in FIGS. 1 and 4. The casing 6 also has an upper side 22 in particular visible in FIG. 5, opposite the lower side 20 and generally parallel to the latter. When the casing 6 is attached on the cartridge 5, the sides 20 and 22 are generally orthogonal to the axis X4, and the upper side 22 of the casing 6 is pressed against the lower side 32 of the cartridge 5. In other words, the casing 6 is attached removably against the lower side 32 of the cartridge 5, via its upper side 22.

Figure 5:
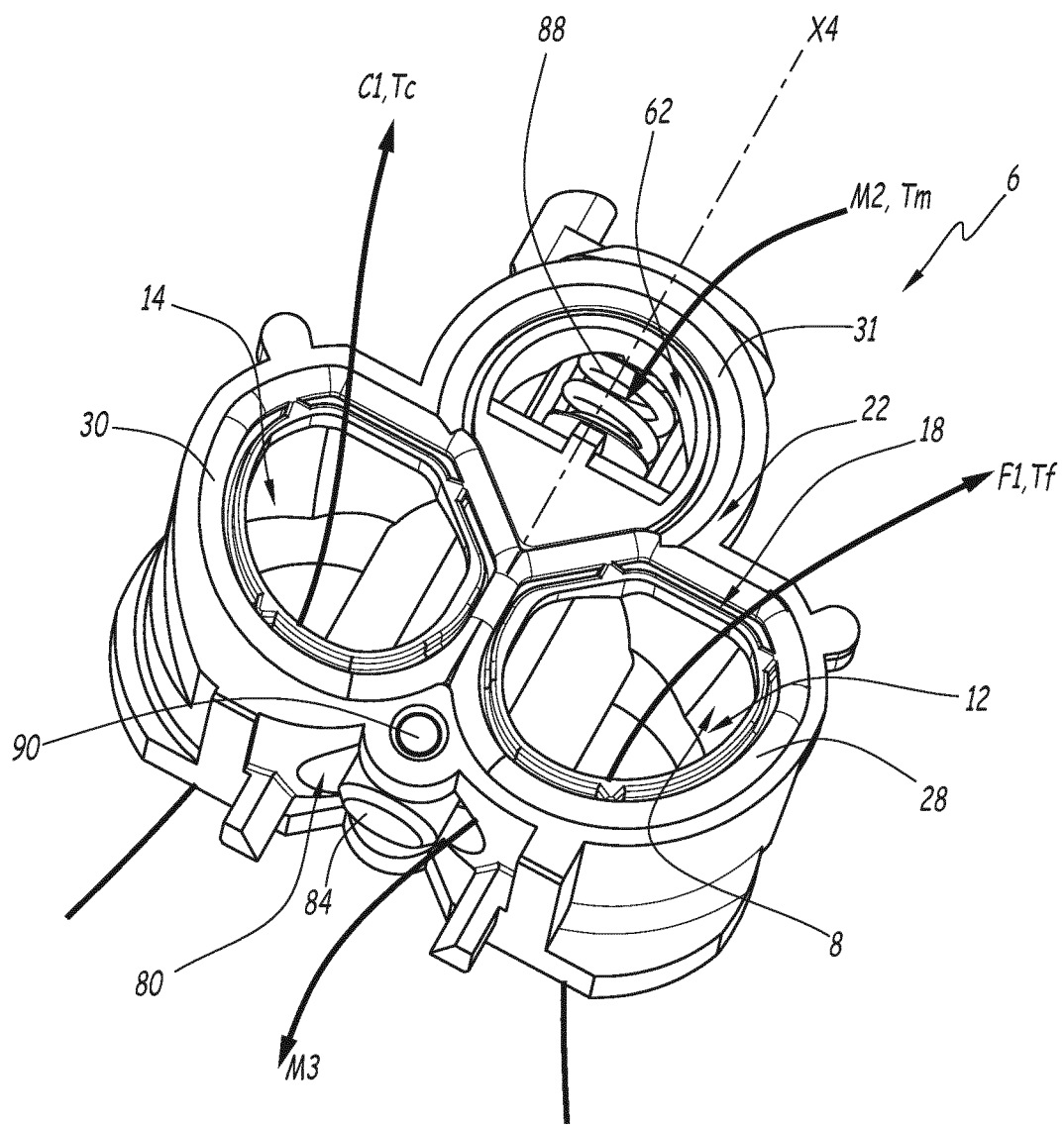
FIG. 5 is a perspective view of the top of an additional casing of the mixing unit of the preceding figures.

As shown in FIGS. 2, 4 and 5, the casing 6 is provided with a first inlet through pipe 8, substantially parallel to the axis X4 and which connects the side 20 to the side 22. The cold water stream F1 is intended to circulate through the pipe 8, from a lower inlet 10 of the inlet pipe 8, emerging on the lower side 20 in the lower part of the mixing unit 2, to an intermediate outlet 12 of the inlet pipe 8, in particular visible in FIG. 5, emerging opposite the lower inlet 10, on the upper side 22 of the casing 6. The cold water stream F1 thus passes through the casing 6 by means of the inlet pipe 8, which leads the stream F1 to the cartridge 5. The lower inlet 10 and the intermediate outlet 12 are preferably centered on an axis parallel to the axis X4.

As shown in FIGS. 3, 4 and 5, the casing 6 is provided with a second inlet through pipe 14, substantially parallel to the axis X4 and which connects the side 20 to the side 22.

The cold water stream C1 is intended to circulate through the pipe 14, from a lower inlet 16 of the inlet pipe 14, emerging on the lower side 20 in the lower part of the mixing unit 2, to an intermediate outlet 18 of the inlet pipe 14, in particular visible in FIG. 5, emerging opposite the lower inlet 16, on the upper side 22 of the casing 6. The hot water stream C1 thus passes through the casing 6 by means of the inlet pipe 14, which leads the stream C1 to the cartridge 5. The lower inlet 16 and the intermediate outlet 18 are preferably centered on an axis parallel to the axis X4. The lower inlets 10 and 16 are adjacent and the intermediate outlets 12 and 18 are adjacent.

When the mixing unit 2 is installed in the body 4 of the tap 1, the lower inlets 10 and 16 are fluidly connected to means for supplying water to the sanitation facility, which for example emerge in the bottom of the body of the tap. As shown in FIGS. 2 to 4, the lower side 20 of the casing 6 is provided with a lower static sealing liner, made in a single piece, and comprising annular lobes 24 and 26. These lobes 24 and 26 respectively surround the lower inlets 10 and 16, to provide the sealing of their fluid connection with water supply means emerging at the bottom of the body 4 of the tap 1. Alternatively, it is possible to provide separate annular sealing gaskets instead of integral annular lobes 24 and 26.

The inlet pipes 8 and 14 of the casing 6 are fluidly connected to the cartridge 5 so as to supply said cartridge 5 with the streams F1 and C1, by means of the lower side 32 of the cartridge 5, as shown in FIGS. 2 and 3.

The cartridge 5 comprises a substantially cylindrical side wall 36 defining the axis X4 and rising from the lower side 32. The cartridge 5 also comprises an upper part 38, ending the side wall 36 opposite the lower side 32. The cartridge 5 and the casing 6 are maintained in the body 4 of the tap 1 while being gripped between, on the one hand, a nut 39, screwed axially relative to the axis X4 in the body 4 so as to bear axially against the upper part 38, and on the other hand, the bottom of the body 4, against which the casing 6 bears axially. The cartridge 5 and the casing 6 are therefore made to bear axially against one another under the pressure of the nut 39 and the bottom of the body 4.

The cartridge 5 also comprises a control lever 40, in particular visible in FIGS. 1 to 3. The lever 40 is configured to be actuated by a user of the tap 1, while being mounted on the upper part 38 movably relative to the side wall 36, by means of an articulation member 42. In the case at hand, the articulation member 42 allows the lever 40 to pivot relative to the wall 36 around the axis X4, while forming a pivoting part relative to the upper part 38, around the axis X4. The lever 40 is in turn mounted pivoting on the articulation member 42 by means of a pivot link 44, allowing the lever 40 to pivot around an axis X44, visible in FIG. 1, perpendicular to the axis X4, relative to the member 42.

The cartridge 5 contains an inner mixing chamber 46 in particular visible in FIGS. 1, 2 and 3, which is in particular delimited by the inner side 32, the cylindrical side wall 36, the upper part 38, the articulation member 42 and the lever 40. The mixing chamber 46 contains mixing means 34 for the first incoming stream F1 and the second incoming stream C1 to form, within the cartridge 5, an outgoing stream M2, called "mixed stream", having an outlet temperature Tm.

The lower side 32 of the cartridge 5 is passed through by a first inlet 48, visible in FIG. 2, and by a second inlet 50, visible in FIG. 3, both emerging within the chamber 46. The inlet 48 is fluidly connected to the intermediate outlet 12, while the inlet 50 is fluidly connected to the intermediate outlet 18, when the lower side 32 of the cartridge 5 is in sealed contact with the upper side 22 of the casing 6. The inlets 48 and 50 are respectively placed across from the outlets 12 and 18. In other words, the first inlet pipe 8 extends the first inlet 48 downward, and the second inlet pipe 14 extends the second inlet 50 downward. The streams F1 and C1 are thus allowed within the mixing chamber 46 respectively via the inlets 48 and 50.

The lower side 32 is also passed through by an outlet 52, called "main outlet", for the outgoing stream M2, emerging on the one hand in the mixing chamber 46, and on the other hand on the casing 6 side. The inlets 48 and 50 as well as the outlet 52 are distributed around the axis X4, as illustrated in FIGS. 4 and 5.

In the illustrated example, the mixing means 34 comprise a set of mixing discs 34A, 34B and 34C, which are contained in the mixing chamber 46, as shown in FIGS. 1 to 3. The mixing discs 34A, 34B and 34C are in surface contact with one another and extend in planes perpendicular to the main axis X4. The set of mixing discs comprises an upper disc 34A, an intermediate disc 34B and a lower disc 34C, the upper 34A and intermediate 34B discs being movable relative to the disc 34C, which is stationary relative to the lower side 32. As is not outlined in the figures, but known in itself, the lower disc 34C comprises two inlet pipes and one outlet pipe that pass through it and that are fluidly connected respectively to the inlets 48 and 50 and to the main outlet 52. The intermediate disc 34B is in sliding and sealed contact with the disc 34C and comprises a blind suction eye, not shown, downwardly open on the disc 34C. The blind suction eye is thus fluidly connected to one or several of the pipes passing through the disc 34C, with a variable degree of occlusion as a function of the position and orientation of the disc 34B relative to the disc 34C. Thus, depending on the relative position of the discs 34B and 34C, the respective flow rate of the incoming streams F1 and C1 allowed into the chamber 46 is adjusted. The incoming streams F1 and C1 circulate through the lower disc 34C from bottom to top, then in the intermediate disc 34B, within which they mixed to form the outgoing stream M2, oriented downward through the lower disc 34C. The ratio and the value of the flow rates of the incoming streams F1 and C1 make it possible to adjust both the temperature Tm and the flow rate of the outgoing stream M2. A sealing of the fluid connections between the discs 34B and 34C can be provided despite the mobility of the disc 34B by using an appropriate ceramic to form said discs 34B and 34C, in a manner known in itself. The disc 34A in turn forms a transmission means between a lower tab 69 of the lever 40 and the disc 34B, such that the means for setting the lever 40 in rotation drives a corresponding movement of the disc 34B relative to the wall 36 of the cartridge 5. Preferably, the disc 34A is secured to the disc 34B, but is made from a different material from that of the disc 34B and suitable for absorbing the movements imposed by the lever 40. The disc 34B is thus rotated around an axis parallel to the axis X4 during the rotation of the lever around the axis X4, which makes it possible to adjust the ratio of the flow rates of the incoming streams F1 and C1 to adjust the temperature Tm. The disc 34B is translated along a direction perpendicular to the axis X4 when the lever 40 is pivoted around the axis X44, which varies the value of the flow rate of the outgoing stream M2.

If one prefers the implementation of a mixing chamber with ceramic discs as described in the preceding, it will be understood that any known mixing means typically used in cartridges for mixing taps can be used instead. In any case, the mixer tap and the cartridge 5 can thus be described as "single control" inasmuch as a single lever 40 makes it possible to control both the flow rate and the temperature Tm of the outgoing stream M2 by adjusting the flow rates of the incoming streams F1 and C1, having a respective temperature Tf and Tc with a different value.

The cartridge 5 comprises a sealing ring 43, visible in FIGS. 1 to 4, provided with a static sealing liner 45, circular and external, the sealing ring 43 protruding on the lower side 32 of the cartridge 5, coaxially with the axis X4. The sealing ring 43 thus forms a skirt that partially surrounds the casing 6, in the extension of the cylindrical shape of the wall 36 of the cartridge 5. The liner 45 is thus in sealed contact with the body 4 of the tap 1, with a complementary cylindrical shape, such that the cartridge 5 and the bottom of the body of the tap delimit a sealed lower chamber 53, in which the casing 6 is contained, the tip 3 of the tap 1 being fluidly connected to said lower chamber.

The outgoing stream M2 formed within the mixing chamber 46 is discharged outside the latter via the outlet 52, under the pressure from the incoming streams F1 and C1, and outside the cartridge 5, to a chamber 60 of the casing 6, called "thermostatic chamber", in particular visible in FIGS. 1 and 6 to 8. The chamber 60 is fluidly connected to the cartridge 5 via an intermediate inlet 62 of the casing 6, which emerges on the surface of the upper side 22 of the casing 6 and is fluidly connected to the main outlet 52 of the cartridge 5.

To provide the sealing of the fluid connections between the casing 6 and the cartridge 5, the upper side 22 of the casing 6 is provided with an upper static sealing liner, formed in one piece, visible in FIGS. 2, 3 and 5 and comprising annular lobes 28, 30 and 31. Said annular lobes 28, 30 and 31 respectively surround the intermediate outlets 12 and 18 and the intermediate inlet 62, in order to provide the sealing of the fluid connection respectively with the inlets 48 and 50 and the main outlet 52 of the cartridge 5. Alternatively, it is possible to provide separate annular sealing gaskets instead of integral annular lobes 28, 30 and 31.

The chamber 60 has a cylindrical general shape, or shape of revolution, that defines an axis X60, called "closing axis", perpendicular to the axis X4. Alternatively, the axis X60 extends in a plane that is orthogonal to the axis X4 without crossing the axis X4. Also alternatively, the axis X60 is not perpendicular to the axis X4, but simply secant to the latter. In any case, the axis X60 extends between the inlet pipe 8 and the inlet pipe 14.

The intermediate inlet 62 emerges radially in the chamber 60 relative to the axis X60, between a first closed end 64 of the chamber 60 and a second open end 66 of the chamber 60. At this second open end 66, the chamber 60 ends with a neck 68, called "closing end", coaxial with the axis X60. In this example, the neck 68 comprises a conical bevel centered on the axis X60 and open in a direction opposite the first closed end 64. The chamber 60 thus conducts the exiting stream M2 from the main outlet to the end 66.

The casing 6 contains a thermostatic element 70 of the mixing unit 2, which extends along the axis X60. In the present example, the thermostatic element is formed by an assembly of several separate parts, some of which are not provided to expand with heat and at least one of which forms a thermodilatable body. Along this axis X60, the thermostatic element 70 includes a heat-sensitive part 72 arranged in a passage section of the exiting stream M2, said passage section being delimited, in the present example, by the neck 68. In general, the heat-sensitive part 72 is arranged on the path of the exiting stream M2, i.e., the main outlet 52, so as to be in contact with the exiting stream M2. The heat-sensitive part 72 in particular comprises a cup 74, arranged in the chamber 60 in the passage of the exiting stream M2. The cup 74 has a shape of revolution around the axis X60 and contains the thermodilatable material, which is for example an appropriate wax. The cup 74 being in contact with the exiting stream M2, the thermodilatable body expands and contracts based on the temperature Tm of the exiting stream M2.

Figure 6:
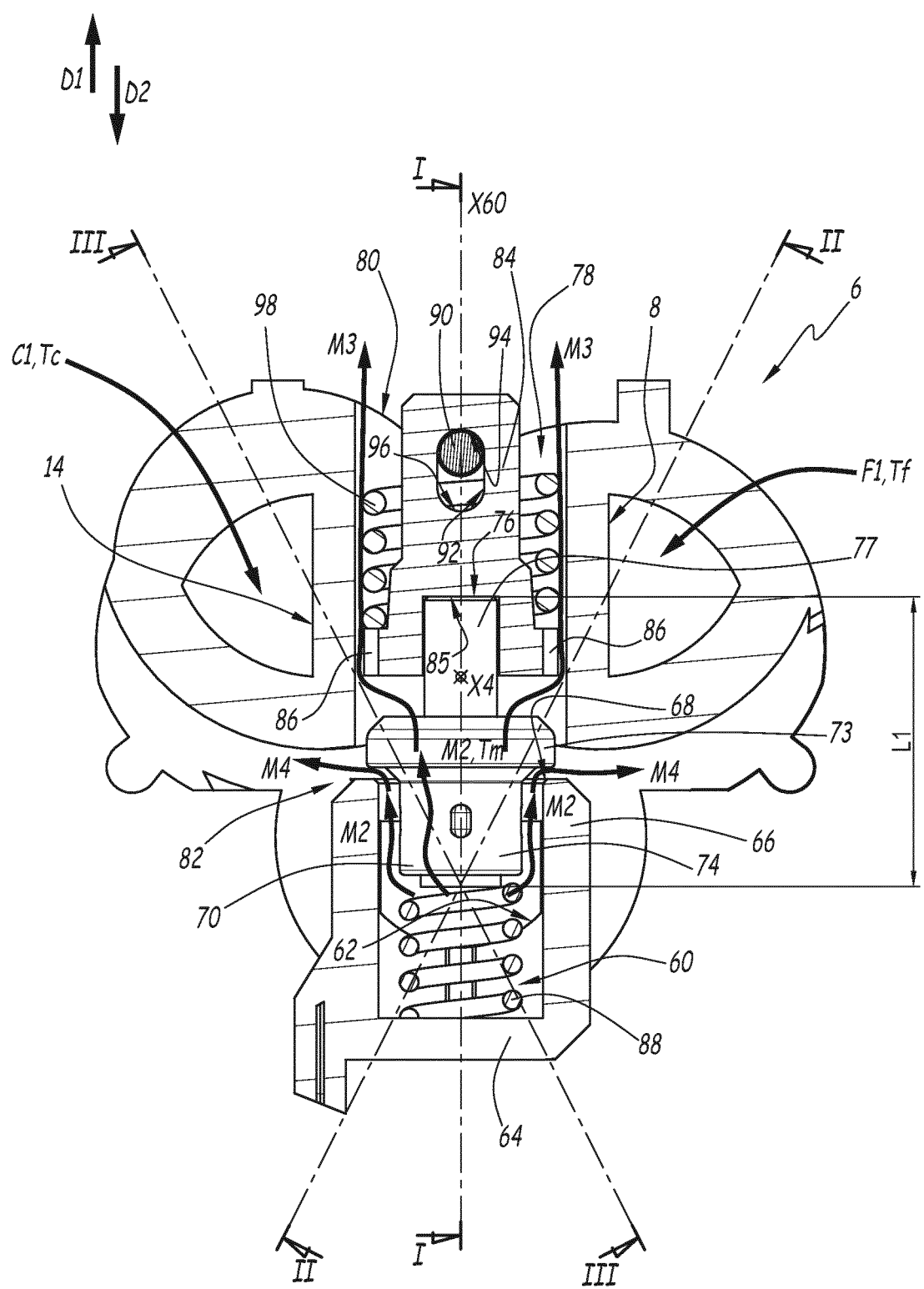
FIGS. 6, 7 and 8 are cross-sections of the additional casing of the preceding figures along a section line VI shown in FIG. 1, the additional casing being shown in three different configurations, the respective section lines I-I, II-II and III-III of FIGS. 1, 2 and 3 being shown in FIG. 6.
Figure 7:
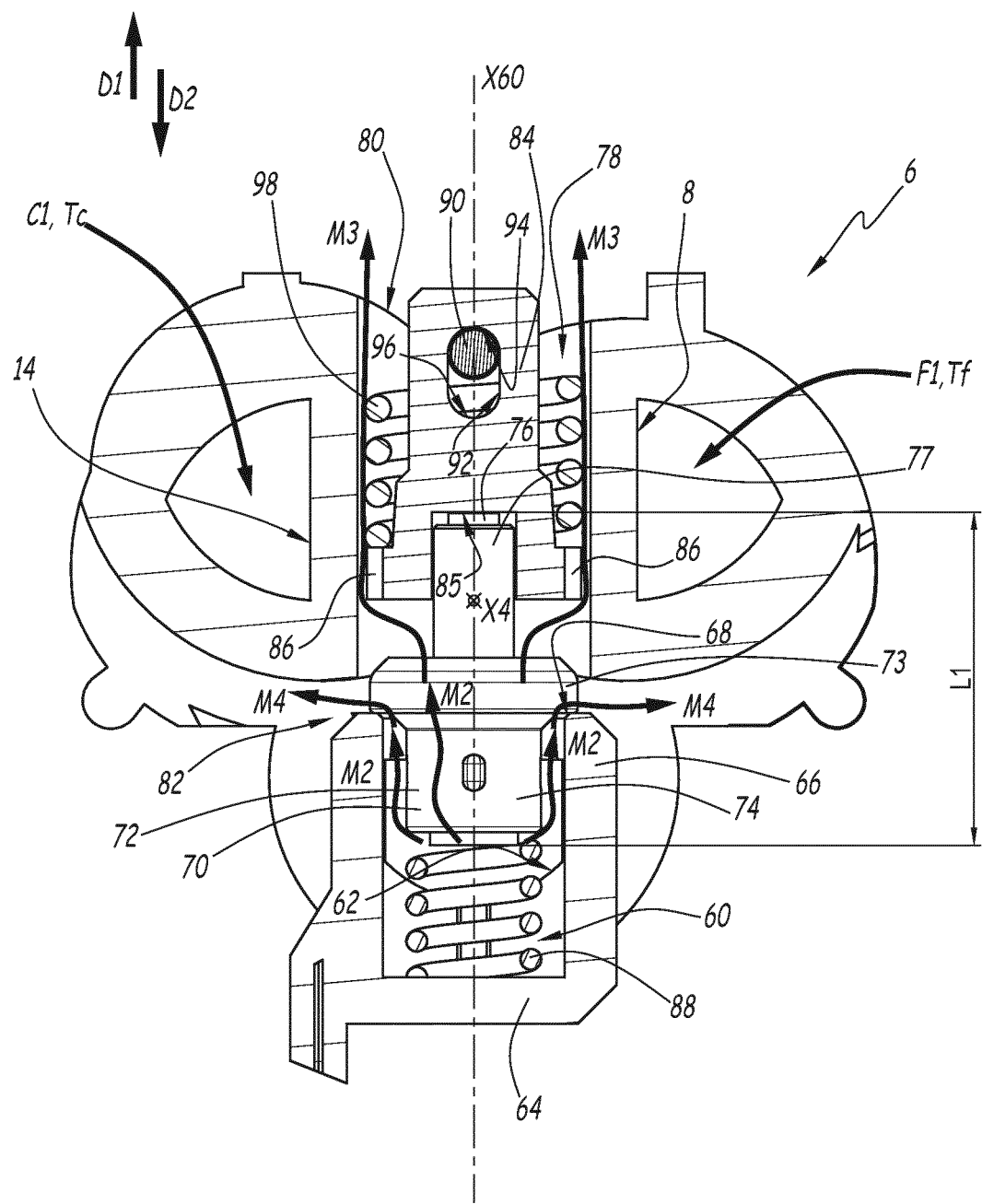
Figure 8:
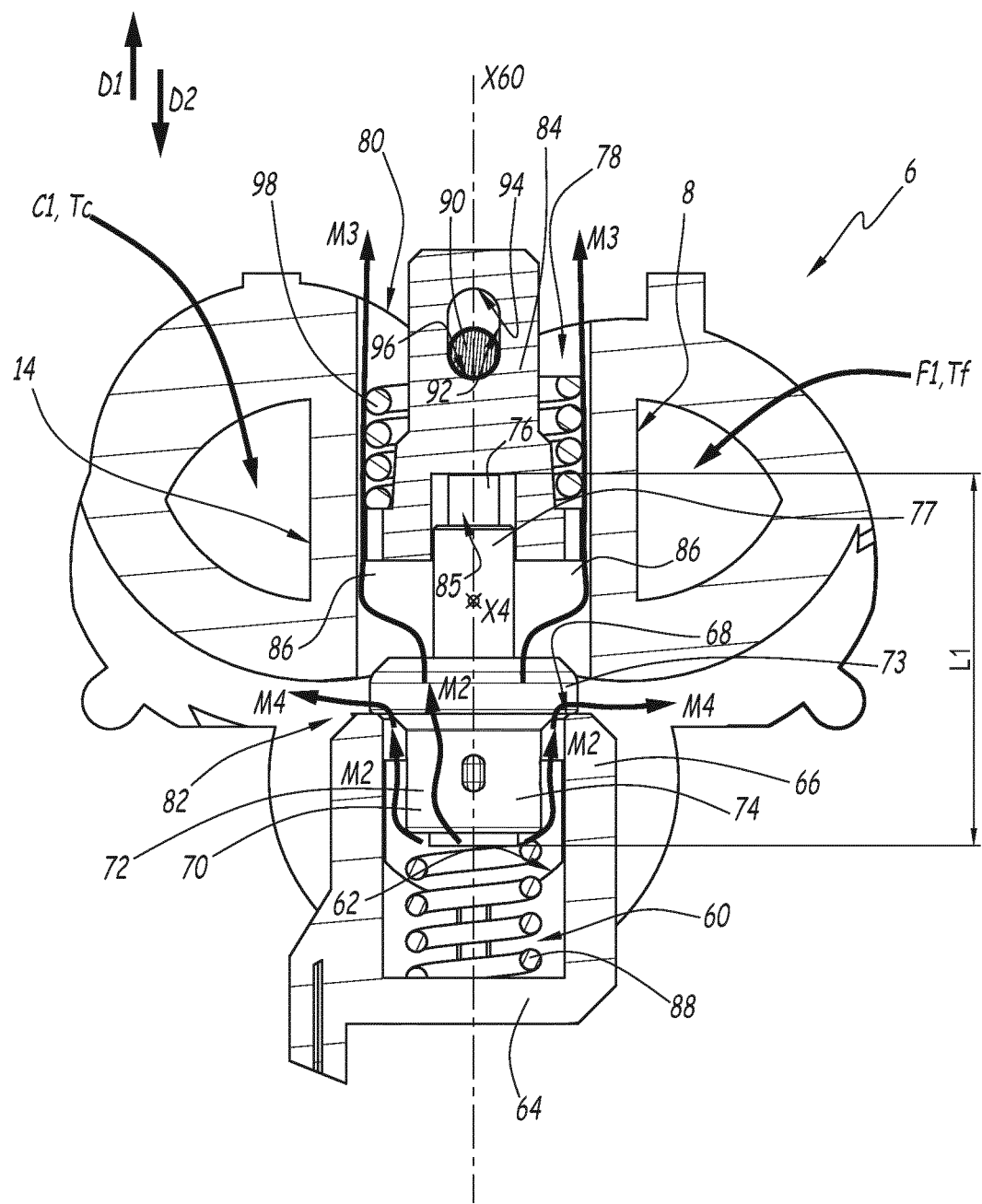
Figure 9:
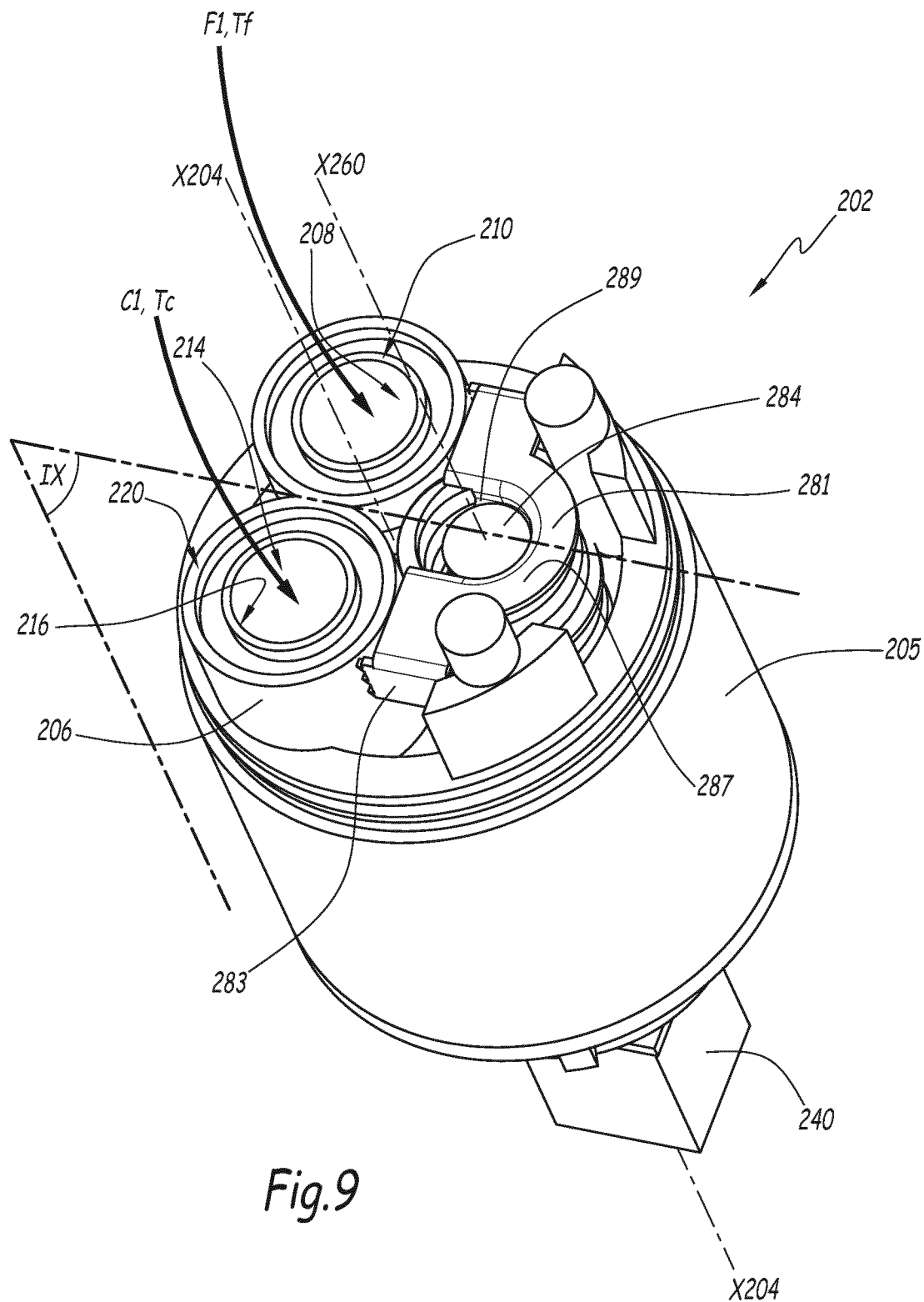
FIG. 9 is a perspective bottom view of a mixing unit according to a second embodiment of the invention.

The heat-sensitive part 72 is translatable parallel to the axis X60. The heat-sensitive part 72 comprises a shoulder 73, able to come into contact with the bevel of the neck 68, all the way around the axis X60, such that the heat-sensitive part 72 is able to close the neck 68 to interrupt all or part of the exiting stream M2. The heat-sensitive part 72, owing to its shoulder 73, thus constitutes a shutter that moves in translation along the axis X60, relative to the closing neck 68, between a completely or partially closed position of the thermostatic chamber 60, and therefore of the main outlet 52, as illustrated in FIGS. 7 and 8, and an open position of the thermostatic chamber 60, and therefore of the main outlet 52, as illustrated in FIG. 6. The open position is oriented in a rear direction D1 relative to the closed position, while the closed position is oriented in a forward direction D2, opposite the rear direction D1, relative to the open position. The neck 68 thus constitutes a closing neck of the main outlet 52, the closing neck 68 being configured to be closed by the shutter.

In the closed position, it is preferable for the shutter to allow the passage of a reduced flow rate of the exiting stream M2, which constitutes only a fraction of the exiting stream M2 authorized flow rate when the shutter is in the open position. To that end, it is preferably provided for the shutter to be placed in non-sealed contact with the neck 68 in the closed position, as illustrated in FIGS. 7 and 8. Optionally, a leak notch of the stream M2, not illustrated, is provided axially through the shoulder 73 and/or the neck 68 to allow the passage of the outgoing stream M2 reduced flow rate despite the placement of the shutter in the closed position. Alternatively, it is possible to provide that the shutter substantially prohibits any escape of the stream M2 through the neck 68 in the closed position, for example by providing the neck 68 or the shoulder 73 with an appropriate sealing gasket.

In the closed position, the heat-sensitive part 72, i.e., the shutter, abuts against the neck 68 in the forward direction D2, as illustrated in FIGS. 7 and 8. The neck 68 thus forms a forward stop of the mixing unit 2.

In an alternative that is not illustrated, a shutter separated from the heat-sensitive part 72 is provided. Preferably, the shutter is secured, in particular axially, to the heat-sensitive part, which is movable relative to the neck 68. In any case, the shutter is actuated by the thermostatic element to move between the closed position and the open position of the main outlet 52 described above.

The mixing unit 2 comprises a main resilient return spring 88 of the heat-sensitive part 72, i.e., the shutter, from the closed position to the open position. This main spring 88 is mounted in compression along the axis X60, between the cup 74 and the closed end 64 of the thermostatic chamber 60, so as to exert a resilient return force in the rear direction D1 on the heat-sensitive part 72. As an alternative to a spring, any appropriate main resilient return element can be implemented to return the shutter from the closed position to the open position.

The casing 6 comprises an outlet chamber 78 that extends along the axis X60 from the neck 68, so as to extend the thermostatic chamber 60 of the casing 6. The outlet chamber 78 has a general shape of revolution around the axis X60, for example cylindrical, and is arranged between the inlet pipe 8 and the inlet pipe 14, perpendicularly, or at least inclined, relative to the latter, such that the casing 6 is particularly compact. In the present example, part of the heat-sensitive part 72 comprising the shoulder 73 extends in the outlet chamber 78.

The chamber 78 ends with an axial outlet 80 opposite the neck 68 and situated between the two inlet pipes 8 and 14, between the lower side 20 and the upper side 22 of the casing 6, as visible in particular in FIG. 4. The axial outlet 80 is oriented radially relative to the axis X4. The chamber 78 further comprises a radial outlet 82, which is arranged radially relative to the axis X60 through a wall of the chamber 78. In the present example, the radial outlet 82 is formed by two separate suction eyes, extending from the neck 68, over only part of the wall of the chamber 78, which is situated between the neck 68 and the inlet pipes 8 and 14. The radial outlet 82 emerges toward the bottom of the mixing unit 2, more specifically on the lower side 20 of the casing 6, as visible in particular in FIG. 4. The exiting stream M2 passing through the neck 68 thus separates into an axial exiting stream M3 and a radial exiting stream M4, in particular shown in FIGS. 1 and 6 to 8.

Alternatively, the radial outlet 82 comprises a single suction eye, or a number of suction eyes greater than two. Alternatively, the chamber 78 comprises several radial outlets, for example extending along the axis X60. The combined presence of these axial 80 and radial 82 outlets makes it possible to limit the impact of the mixing unit 2 on the flow rate of the exiting stream M1 by facilitating the escape of the exiting streams M2, M3 and M4 from the casing 6.

In any case, the axial exiting stream M3 and the radial exiting stream M4 are poured into the lower chamber 53 of the tap 1, in which they are grouped together to form the exiting stream M1 leaving the tip 3.

As shown in FIGS. 7 and 8, the thermostatic element 70 comprises a second part, formed in this example by a piston 76, extending in the outlet chamber 78. The piston 76 is for example cylindrical with a circular base. The piston 76 is coaxial to the axis X60 and is mounted translatably relative to the heat-sensitive part 72 along the first axis X60, under the action of the thermodilatable body contained in the cup 74. More specifically, the piston 76 is mounted sliding within a guide 77 of the thermostatic element 70, the guide 77 being coaxial to the axis X60 and forming an axial sheath secured to the heat-sensitive part 72.

The mixing unit 2 also comprises an overtravel plunger 84, against which the piston 76 abuts axially along the axis X60. More specifically, the overtravel plunger 84 comprises an axial surface 85 that forms a rear stop, against which the piston bears in the rear direction D1.

The overtravel plunger 84 is translatable along the axis X60 in the outlet chamber 78. In the present example, the overtravel plunger 84 comprises axial outer ribs 86, for example four ribs 86. The ribs 86 are in sliding contact with the wall of the outlet chamber 78 to guide the translation of the overtravel plunger 84 along the axis X60. The axial outer ribs 86 arrange circulation interstices between them for the axial exiting stream M3 along the overtravel plunger 84, in order to facilitate the circulation of said stream M3 to the axial outlet 80.

The overtravel plunger 84 translates between a normal position, shown in FIGS. 6 and 7, and an overtravel position, shown in FIG. 8. By going from the normal position to the overtravel position, the overtravel plunger 84 moves away from the neck 68. In other words, the overtravel position is situated in the rear direction D1 relative to the normal position. In the present example, the casing 6 comprises a pin 90, stationary relative to the outlet chamber 78, and extending, in this example, parallel to the axis X4 across the axial outlet 80. The pin 90 passes through an oblong hole 92 arranged through the overtravel plunger 84, perpendicular to the axis X60. The pin 90 thus limits the movement of the plunger 84 in the direction D2, in which a rear end 94 of the oblong hole 92 is able to abut against the pin 90, as well as in the direction D1, in which a front end 96 of the oblong hole can abut against the pin 90. In practice, in the normal position, there is contact between the end 94 of the oblong hole 92 and the pin, while in the overtravel position, there is play between the front end 96 of the oblong hole 92 and the pin 90. Thus, the pin 90 advantageously contributes to guiding the overtravel plunger 84 in translation along the axis X60, while blocking its rotation around said axis X60 relative to the outlet chamber 78.

The casing 6 comprises an auxiliary spring 98, which is compressed axially along the axis X60 between the pin 90 and a rear axial surface of the axial outer ribs 86. The auxiliary spring 98 exerts a resilient return force of the overtravel plunger 84 from the overtravel position to the normal position. It is provided that the resilient return force of the auxiliary spring 98 is greater than that of the resilient return force of the main spring 88. To that end, for example, the stiffness constant of the auxiliary spring 98 is equal to a value of about two times the value of the stiffness constant of the main spring 88. In the present example, the chamber 78 forms an enclosure of the spring 98 over its entire length, such that the casing 6 is particularly compact.

As an alternative to an auxiliary spring 98, any appropriate auxiliary element can be implemented to exert a resilient return force of the overtravel plunger 84 from the overtravel position to the normal position.

As a result of the structural arrangements described above, the mixing unit 2 has the following operation. Depending on the temperature Tm of the exiting stream M2, the thermostatic element 70 varies the relative position of the heat-sensitive part 72 and the piston 76 along the closing axis.

The shutter of the mixing unit 2 can adopt a first configuration, called "open configuration" or "open position" illustrated in FIGS. 1 and 6. The open configuration is obtained when the temperature Tm is below a predetermined threshold value, for example 46° C. (degrees Celsius), the thermostatic element 70 has a length L1, measured along the axis X60, the value of which is minimal. Below the predetermined threshold value, the thermodilatable body of the heat-sensitive part 72 is designed to allow the piston 76 to enter the guide 77, preferably completely, under the return forces of the springs 88 and 98. More specifically, the main spring 88 keeps the thermostatic element 70 bearing against the axial surface 85 of the overtravel plunger 84, via the end of the piston 76 or the guide 77. In this configuration, the shoulder 73 is in the open position of the closing neck 68, while being situated axially away from the latter. The entire flow rate of the exiting stream M2 is allowed to escape through the neck 68. In this open configuration, the overtravel plunger 84 is kept in the normal position, since the stiffness of the auxiliary spring 98 is greater than that of the main spring 88.

The mixing unit 2 can adopt a second configuration, called "closed configuration" or "closed position", illustrated in FIGS. 7 and 8. This closed configuration is adopted when the temperature Tm exceeds the aforementioned threshold value, the length L1 of the thermostatic element 70 reaches a value greater than that of the configuration of FIG.

6. In particular, the thermodilatable body has pushed the piston 76 in the rear direction D1 so as to increase the value of the length L1. The value of the length L1 is increased against the main spring 88, which is therefore deformed in compression. The shoulder 73 abuts against the closing neck 68 in the forward direction D2, such that the shutter that it forms is in the closed position. In other words, in the configuration of FIG. 7, the heat-sensitive part 72 has been moved relative to the neck 68 in the forward direction D2, relative to the configuration of FIG. 6, until it abuts against the neck 68. In the closed configuration, the flow rate of the exiting stream M2 passing through the neck 68 is limited or interrupted by the shutter. As a result, the closed configuration constitutes a safety configuration, in that, if the temperature Tm exceeds the predetermined threshold value, the flow rate of the exiting stream M1 is limited or interrupted to avoid any burn risk of the user of the mixing tap 1. Owing to this particular operation, the user is advantageously alerted that the mixing means 34 are adjusted to generate an exiting stream M2 with an excessive temperature Tm, since the exiting stream M1 leaving the tip 3 is very weak or interrupted. Furthermore, the flow rate of the exiting stream M1 being decreased when the temperature is too high, hot water savings, i.e., energy savings, are achieved.

In this closed configuration, when the temperature Tm is close to the predetermined threshold value, the overtravel plunger 84 is kept in the normal position as illustrated in FIG. 7, since the stiffness of the auxiliary spring 98 is greater than that of the main spring 88. As a result, the piston 76 remains substantially stationary relative to the closing neck 68 between the configuration of FIG. 6 and the configuration of FIG. 7.

In this closed configuration, when the temperature Tm is further from the predetermined threshold value, and for example exceeds 50° C. as illustrated in FIG. 8, the length L1 reaches a sufficient value for the overtravel plunger 84 to be moved by the piston 76 in the rear direction D1, to the overtravel position. In particular, when the thermostatic element 70 bears against the neck 68 via the shoulder 73, any increase in the value of the length L1 in this closed configuration causes the overtravel plunger 84 to move in the direction D1, against the auxiliary spring 98.

According to an alternative, not illustrated, of the first embodiment of FIGS. 1 to 8, the additional casing 6 is permanently fastened or is integral with the cartridge 5, such that the mixing unit 2 forms a unitary assembly. More specifically, in this alternative, the upper side 22 of the casing and the lower side 32 of the cartridge are grouped together to form a single-piece part, which advantageously prevents the implementation of a sealing gasket with lobes 28, 30 and 31, while facilitating the mounting of the mixing unit 2 within the body 4.

FIGS. 9 to 12 illustrate a mixing unit 202, according to the second embodiment, which has features similar to those of the mixing unit 2 of the first embodiment illustrated in FIGS. 1 to 8. The features similar to the aforementioned first and second embodiments are designated by a similar outline in the drawing, and/or reference numbers increased by 200 for the mixing unit 202, relative to the mixing unit 2.

The mixing unit 202 is configured to be integrated into a tap body similar to that of FIG. 1.

The mixing unit 202 of FIGS. 9 to 12 defines a main axis X204 and comprises, along said axis X204, a cartridge 205, as well as an additional casing 206, which has a lower side 220 and comprises a first inlet pipe 208 with a lower inlet 210 with a first incoming water stream F1 at a temperature Tf, as well as a second inlet pipe 14 with a lower inlet 216 with a second incoming water stream C1 at a temperature Tc.

Figure 10:
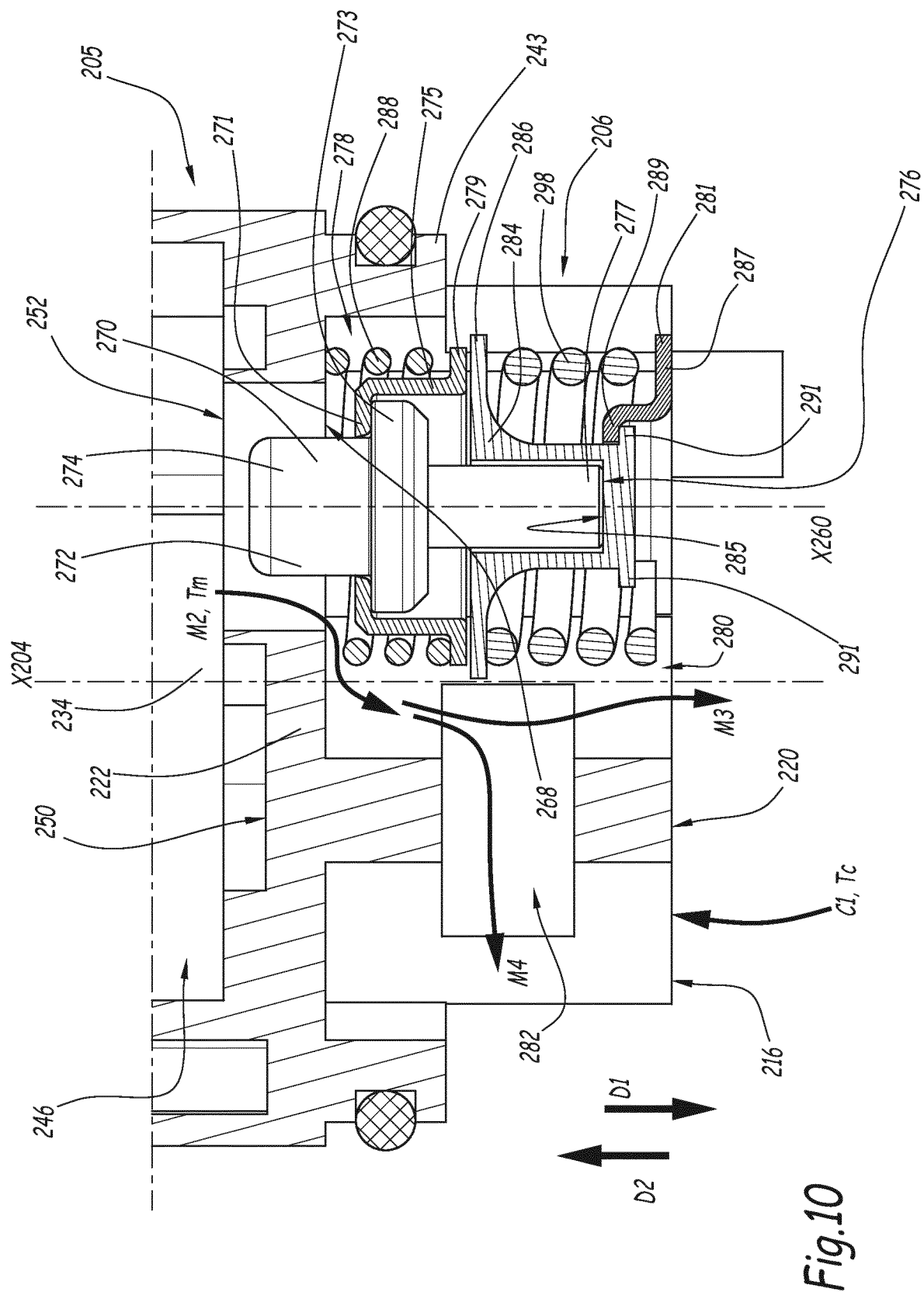
FIGS. 10 to 12 are partial sectional views of FIG. 9 along a plane IX, showing part of the mixing unit of FIG. 9 in three different configurations.
Figure 11:
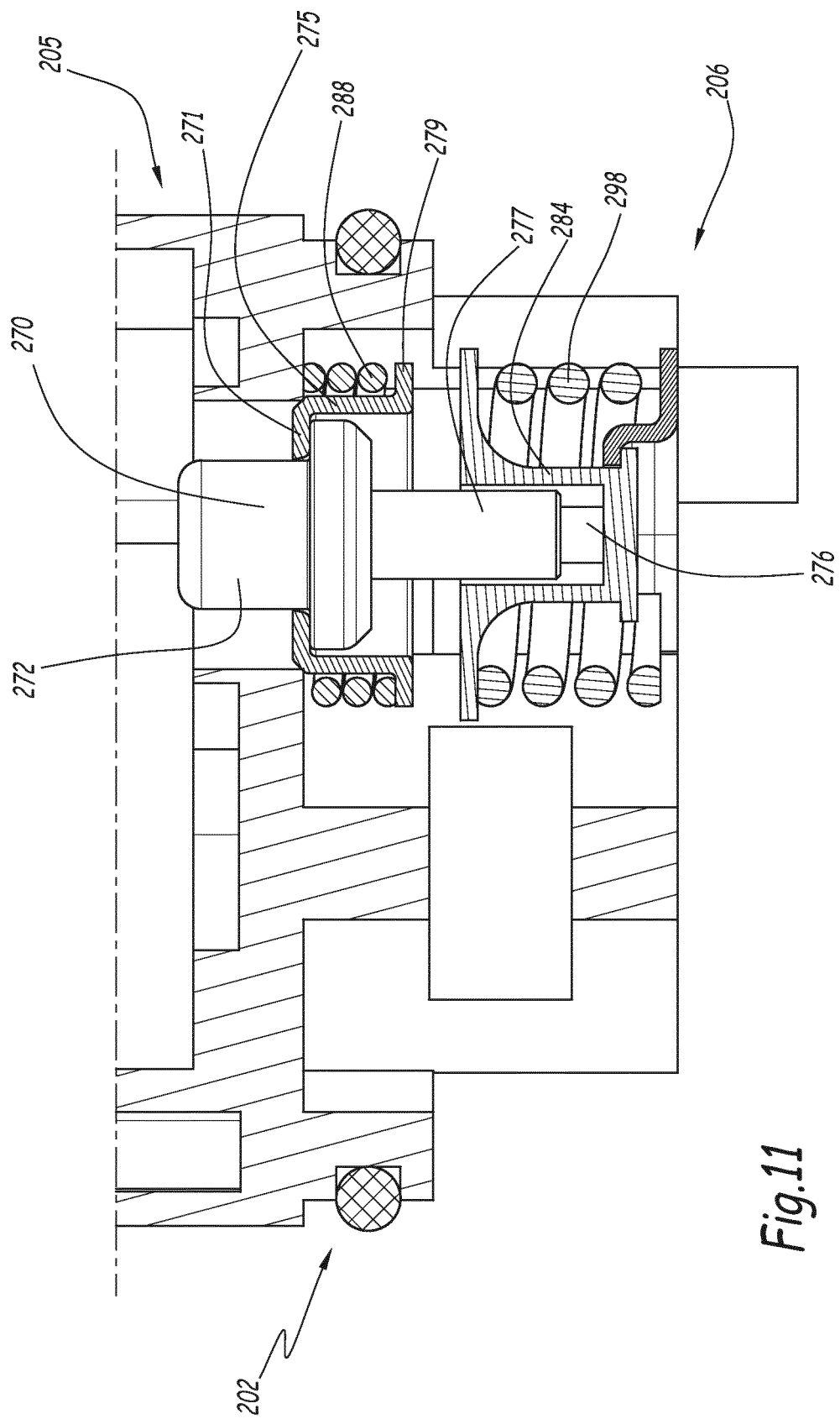
Figure 12:
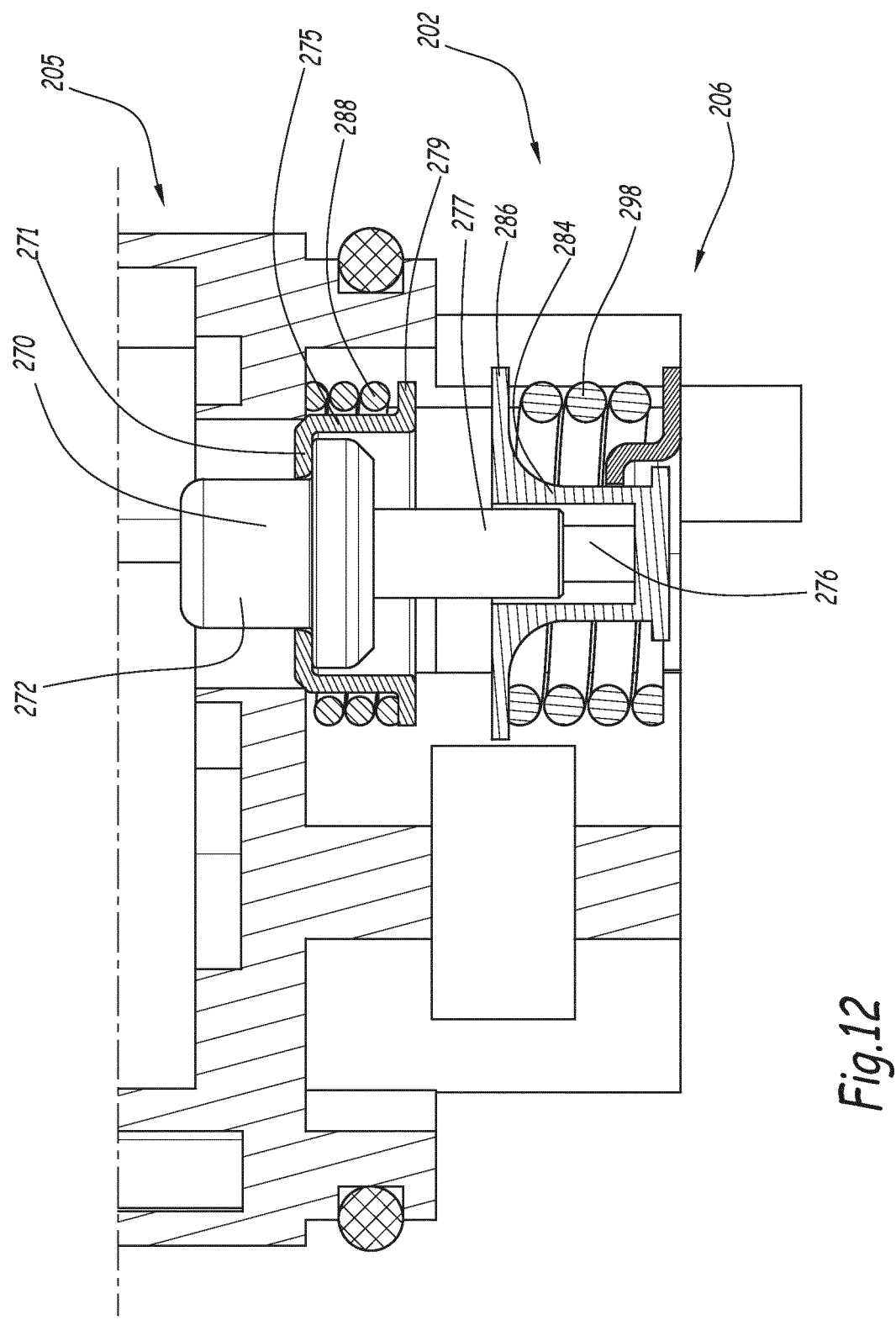

As shown in FIGS. 10 to 12, the additional casing 206 is integral with the cartridge 205, such that the mixing unit 2 forms a unitary assembly. More specifically, the upper side of the casing 206 and the lower side of the cartridge 205 are grouped together to form a common part 222 in a single piece. The part 222 is passed through by the two inlet pipes 208 and 214, which both emerge in an inner mixing chamber 246 of the cartridge 205, respectively via a first inlet, not shown in the figures, and a second inlet 250, visible in FIGS. 10 to 12.

In the embodiment of FIGS. 9 to 12, the incoming streams F1 and C1 are mixed in the mixing chamber 246 using mixing means 234 of the cartridge 205, which preferably comprise a set of discs, not shown in the figures, similar to that described above. The mixing means 234 are adjustable using a control lever 240 of the cartridge 205. The mixing of the streams F1 and C1 leads to the emission of an exiting water stream M2, at a temperature Tm, outside the chamber 246 of the cartridge 205, via a main outlet 252, arranged in the common part 222.

The casing 206 comprises a closing neck 268, which is fluidly connected to the outlet 252 while being formed on a lower surface of the part 222. The neck 268 and the outlet 252 are aligned on a closing axis X260 parallel to the axis X204 and preferably not combined with the axis X204.

The mixing unit 202 contains a thermostatic element 270, which extends coaxially to the closing axis X260. The thermostatic element 270 comprises a heat-sensitive part 272 arranged in a passage section of the exiting stream M2 delimited perpendicular to the axis X260 by the neck 268. The heat-sensitive part 272 comprises a cup 274 with a shoulder 273, coaxial to the axis X260. A closing part 275, comprising an inner collar 271, is mounted in downward axial bearing, against the shoulder 273, via the inner collar 271. This inner collar 271 surrounds the cup 274, such that the closing part 275 is radially connected to the heat-sensitive part 272.

The heat-sensitive part 272 and the closing part 275 form a shutter and are movably secured along the axis X260 between an open configuration, illustrated in FIG. 10, and a closed configuration, illustrated in FIG. 11. In the closed configuration, the outer edge of the inner collar 271 abuts forwardly against the neck 268, in a forward direction D2 opposite the direction D1. This outer edge forms a conical bevel centered on the axis X260, the neck 268 being stripped of any bevel.

The closing part 275 also comprises an outer collar 279 axially opposite the inner collar 271. The mixing unit 202 comprises a main resilient return spring 288 inserted between the outer collar 279 and the neck 268, so as to resiliently exert an axial force that tends to separate the shutter from the neck 268, so as to resiliently return the shutter toward the open configuration.

The thermostatic element 270 also comprises a piston 276 coaxial to the axis X260 and mounted axially translatably relative to the heat-sensitive part 272, via a guide 277, under the action of a thermodilatable body contained in the thermostatic element 270.

The mixing unit 202 also comprises an overtravel plunger 284, against a rear stop 285 of which the piston 276 abuts axially along the axis X260, in a rear direction D1 oriented toward the bottom of FIG. 10. The overtravel plunger 284 his translatable along the axis X260, between a normal position, shown in FIGS. 10 and 11, and an overtravel position, shown in FIG. 12.

The mixing unit 202 also comprises a stirrup 281, which is attached on the cartridge 205 so as to be axially connected to the latter along the axis X260. The stirrup 281 comprises, in the case at hand, two tabs for attaching to the cartridge 205, parallel to the axis X204, whereof one tab 283 is partially visible in FIG. 9. The attachment tabs 283 extend on either side of thermostatic element 270 and the neck 268. The attachment tabs are connected to each other by a bridge 287 of the stirrup 281, the bridge 287 being U-shaped to bypass the axis X260 and the overtravel plunger 284. The bridge 287 is provided with an inner trough 289, which forms an axial bearing surface of a shoulder 291 of the plunger 284 in the direction D2.

The unit 202 comprises an auxiliary spring 298, which is inserted axially along the axis X60, between a collar 286 of the plunger 284 and the bridge 287 of the stirrup 281, so as to resiliently push the plunger 284 back toward the neck 268.

Depending on the position of the plunger 276 relative to the heat-sensitive part 272, the length of the thermostatic element 270 is varied, such that the shutter moves between its open configuration, visible in FIG. 10, and its closed configuration, visible in FIG. 11. In these configurations, the plunger 284 is kept in the normal position under the action of the auxiliary spring 298. Nevertheless, in the closed configuration, if the length of the thermostatic element 270 increases further, the plunger 284 enters the overtravel position against the auxiliary spring 298, as illustrated in FIG. 12. This movement in the direction D1 of the plunger 284 is obtained by causing the shutter to bear against the neck 268 and increasing the length of the thermostatic element 270. In the overtravel position, the plunger 284 is further away from the neck 268 than in the normal position.

The inlet pipes 208 and 214, the common part 222, and a sealing ring 243 of the cartridge 205 delimit an outlet housing 278, centered on the axis X260, in which the shutter, the springs 288 and 298 as well as the plunger 284 are housed. The outlet housing 278 extends from the closing neck 268 and forms a cavity, which is open to form an axial outlet 280 in the lower part of the unit 202. In this second embodiment, a portion of the auxiliary spring 298 emerges from the outlet housing 278, which does not marry the entire perimeter of said spring 298, unlike the outlet chamber 78 of the embodiment of FIGS. 1 to 8. The specific shape of the outlet housing 278 facilitates the flow of the exiting stream M2. A radial outlet 282 is optionally arranged, radially relative to the closing axis X260, between the pipes 208 and 214. The exiting stream M2 passing through the neck 68 separates into an axial exiting stream M3, through the axial outlet 280, and a radial exiting stream M4, through the radial outlet 282.

Alternatively, the cartridge 205 and the casing 206 are assembled to one another, as is the case for the mixing unit 2 of FIGS. 1 to 8.

In the examples defined above, the thermostatic element 70 or 270 of the unit 2 or 202 more generally forms a heat-sensitive actuator, with a first part, formed by the heat-sensitive part 72 or 272, and a second part, formed by the piston 76 or 276. In these examples, the first part and the second part form separate pieces from one another.

Alternatively, irrespective of the embodiment of the mixing unit, the heat-sensitive actuator may be formed in one piece, while advantageously being made from a thermodilatable material, such as a shape memory alloy. In this alternative case, the first and second parts of the heat-sensitive actuator are in one piece, the movement of one part relative to the other being the result of a deformation of the heat-sensitive material.

Figure 13:
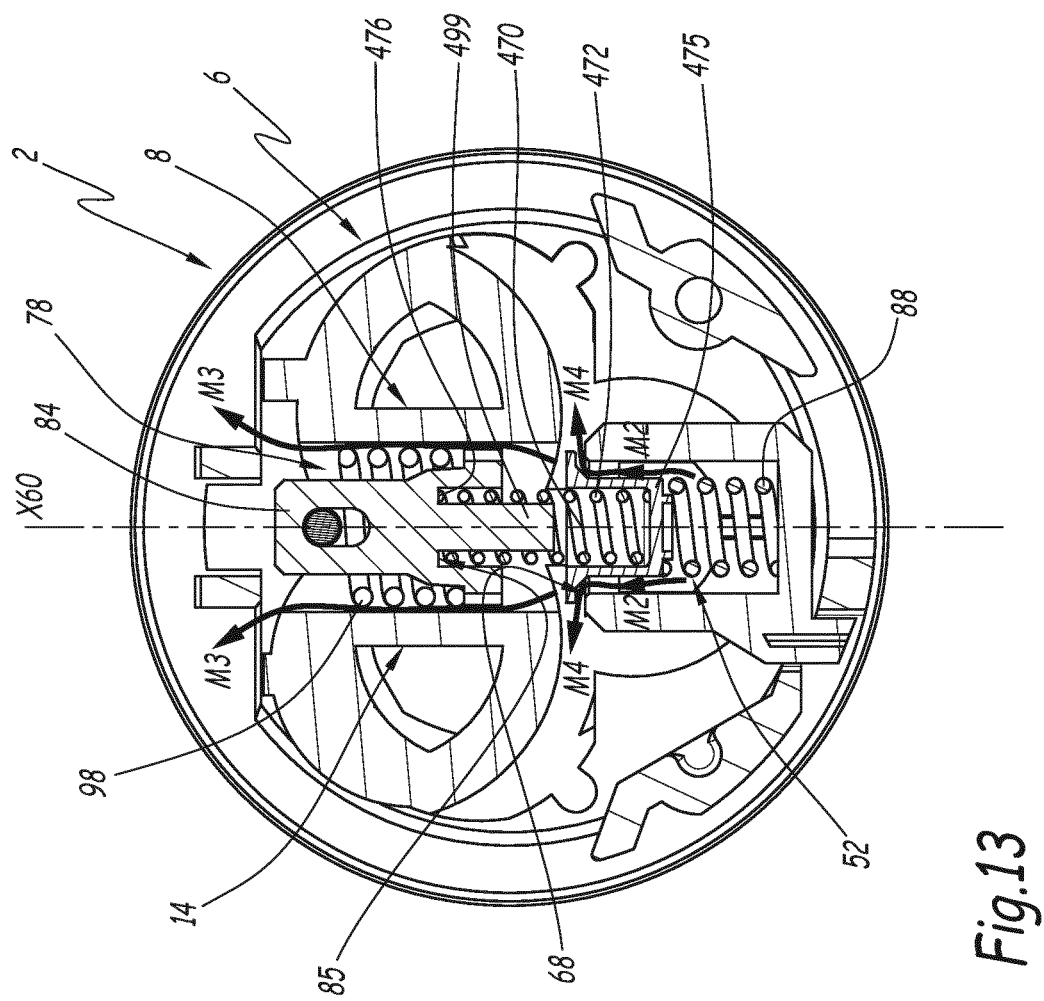
FIG. 13 is a sectional view similar to FIG. 6, for a third embodiment of the invention.

FIG. 13 illustrates a third embodiment of the invention corresponding to this alternative case. It involves the mixing unit 2 of the first embodiment illustrated in FIGS. 1 to 8, in which the thermostatic element 70 has been replaced by a heat-sensitive actuator 470 made from shape memory alloy, associated with an attached shutter 475. The heat-sensitive actuator 470 is in the form of a helical spring coaxial or parallel to the closing axis X60. The heat-sensitive actuator 470 comprises, on the one hand, a first heat-sensitive part 472, arranged at the main outlet 52, in place of the heat-sensitive part 72 defined above, and on the other hand, a second part 476 that is also heat-sensitive, forming a part in one piece with the first part 472. The second part 476 is actuated in translation by the first part 472 along the closing axis X60 by deformation of the heat-sensitive actuator 470 based on the temperature Tm of the exiting stream M2. The shutter 475 has a shape similar to that of the cup 74 defined above, and is borne by the first part 472 of the actuator 470, so as to be able to move between the open and closed configurations of the neck 68. In FIG. 13, the shutter 475 is in the open position. The second part 476 bears axially against the axial surface 85 of the overtravel plunger 84. The latter is advantageously provided with a guide rod 499, protruding from the surface 85 coaxially with the axis X60, on which the heat-sensitive actuator 470 is slipped, so as to be radially maintained or retained.

Alternatively to a helical spring form, other embodiments of the heat-sensitive actuator 470 are possible, for example in a bellows, depending on the application.

The mixing unit 202 of FIGS. 9 to 12 may also include a heat-sensitive actuator made from a shape memory alloy, said actuator then being adapted to replace the thermostatic element 270.

In the above, streams of water are used. However, irrespective of the embodiment, other fluids can be used in place of water, preferably streams of liquid fluids. In general, the inlet 48 corresponds to an intake for a first incoming stream F1 of fluid having a first temperature Tf, while the inlet 50 or 250 corresponds to an intake for a second incoming stream C1 of fluid having a second temperature Tc that is higher than the first temperature Tf. The fluids of the first incoming stream F1 and the second incoming stream C1 are preferably identical and liquid, but may nevertheless be of different natures. The water escaping from the tip 3 of the tap 1 thus corresponds to an output stream M1 of fluid, which is formed by mixing first and second incoming streams F1 and C1 within the mixer tap 1.

The features of each embodiment and alternative above can be used in the other embodiments and alternatives, as long as it is technically possible to do so.

The invention claimed is:

1. A mixing unit for a mixer tap, the mixing unit comprising:
   a first inlet for a first incoming stream of fluid having a first temperature,
   a second inlet for a second incoming stream of fluid having a second temperature higher than the first temperature,
   a mixer mixing the first incoming stream with the second incoming stream to form an outgoing stream of fluid having an outlet temperature,
   a main outlet for the outgoing stream, and
   a heat-sensitive actuator, comprising:
      a first part, which is heat-sensitive and which is arranged, at least in part, at the main outlet, and
      a second part, actuated in translation by the first part along a closing axis, wherein the mixing unit comprises a shutter, which is actuated by the heat-sensitive actuator, so as to move between a closed position, at least partial, of the main outlet and an open position of the main outlet, based on the relative position of the first part and the second part of the heat-sensitive actuator along the closing axis.

2. The mixing unit according to claim 1, wherein:
the mixing unit comprises a rear stop, the second part bearing against the rear stop in a rear direction along the closing axis, and
the shutter is secured to the first part, or is formed at least in part by the first part, the first part being movable between the closed position and the open position.

3. The mixing unit according to claim 2, wherein the mixing unit comprises:
a front stop, against which the shutter abuts in a forward direction, opposite the rear direction, when the shutter arrives in the closed position,
an overtravel plunger, which is translatable along the closing axis between a normal position and an overtravel position situated in the rear direction relative to the normal position, the overtravel plunger comprising the rear stop, and
an auxiliary resilient return element of the overtravel plunger from the overtravel position to the normal position.

4. The mixing unit according to claim 3, wherein the overtravel plunger comprises axial outer ribs guiding the translation of the overtravel plunger along the closing axis, the axial outer ribs arranging circulation interstices between them for the exiting stream along the overtravel plunger.

5. The mixing unit according to claim 1, wherein the mixing unit comprises a main resilient return element of the shutter from the closed position to the open position.

6. The mixing unit according to claim 1, wherein:
the mixer comprises a mixing chamber within which the first inlet, the second inlet and the main outlet emerge, and
the mixing unit comprises a closing neck, which is fluidly connected to the main outlet and which is configured to be closed by the shutter in the closed position, the first part being arranged in a passage section of the closing neck.

7. The mixing unit according to claim 6, wherein:
the mixing unit comprises an outlet chamber, or an outlet housing, which extends along the closing axis from the closing neck to an axial outlet of the mixing unit, and the outlet chamber or the outlet housing comprises at least one radial outlet, which is arranged radially relative to the closing axis.

8. The mixing unit according to claim 7, wherein the mixing unit comprises:
the outlet chamber,
a first inlet pipe, which extends the first inlet, and
a second inlet pipe, which extends the second inlet, the outlet chamber being arranged between the first inlet pipe and the second inlet pipe.

9. The mixing unit according to claim 1, wherein the mixing unit comprises:
a cartridge, which includes the mixer and which comprises a lower side, passed through by the first inlet, by the second inlet and by the main outlet, and
an additional casing, which contains the heat-sensitive actuator, as well as the shutter, and which comprises an upper side by means of which the additional casing is attached against the lower side of the cartridge.

10. The mixing unit according to claim 1, wherein the heat-sensitive actuator is a thermostatic element, wherein the first part comprises a cup containing a thermodilatable body, and wherein the second part is a piston sliding relative to the first part along the closing axis.

11. The mixing unit according to claim 1, wherein:
the heat-sensitive actuator is made, at least in part, from shape memory alloy, so as to be thermodilatable along the closing axis,
the second part of the heat-sensitive actuator is heat-sensitive and forms a single-piece part with the first part, and
the translation of the second part relative to the first part is obtained by reversible deformation of the heat-sensitive actuator.

12. The mixing unit according to claim 1, wherein the mixing unit has a cylindrical general shape defining a main axis of the mixing unit, the closing axis extending either in a plane substantially orthogonal to the main axis, or parallel to the main axis.

13. A mixer tap comprising a mixing unit according to claim 1.

14. The mixing unit according to claim 7, wherein the at least one radial outlet extends from the closing neck.

* * * * *